(12) United States Patent
Halcom

(10) Patent No.: US 8,919,692 B2
(45) Date of Patent: Dec. 30, 2014

(54) PROXIMITY SENSOR VALVE AND LOCK SYSTEM USING SAME

(75) Inventor: Lance Halcom, Coppell, TX (US)

(73) Assignee: Sikorsky Aircraft Corporation, Stratford, CT (US)

( * ) Notice: Subject to any disclaimer, the term of this patent is extended or adjusted under 35 U.S.C. 154(b) by 323 days.

(21) Appl. No.: 13/258,506

(22) PCT Filed: Mar. 4, 2010

(86) PCT No.: PCT/US2010/026153
§ 371 (c)(1),
(2), (4) Date: Sep. 22, 2011

(87) PCT Pub. No.: WO2010/141132
PCT Pub. Date: Dec. 9, 2010

(65) Prior Publication Data
US 2012/0018660 A1 Jan. 26, 2012

Related U.S. Application Data

(60) Provisional application No. 61/173,238, filed on Apr. 28, 2009.

(51) Int. Cl.
*B64C 27/50* (2006.01)
*F15B 9/08* (2006.01)

(52) U.S. Cl.
CPC .. *B64C 27/50* (2013.01); *F15B 9/08* (2013.01)
USPC ......................................... 244/49; 244/17.11

(58) Field of Classification Search
CPC ...... B64C 27/022; B64C 27/50; B64C 11/28; B64C 3/56; B64C 3/546

USPC ..................... 244/224, 17.11, 49, 7 A, 17.25; 416/143, 142

See application file for complete search history.

(56) References Cited

U.S. PATENT DOCUMENTS 2,417,870 A 3/1947 Haines
2,491,375 A 12/1949 Hardy
(Continued)

FOREIGN PATENT DOCUMENTS

DE 1238339 4/1967
FR 1376282 9/1964
(Continued)

OTHER PUBLICATIONS

PCT International Search Report and Written Opinion, mailed Dec. 14, 2010, PCT/US2010/026153.

(Continued)

*Primary Examiner* — Tien Dinh
*Assistant Examiner* — Richard R Green
(74) *Attorney, Agent, or Firm* — Carlson, Gaskey & Olds, P.C.

(57) ABSTRACT

A proximity sensor valve includes a housing which defines a fluid inlet and a fluid outlet in communication with a cavity. A plunger pin within the cavity for movement along an axis, the plunger pin movable between an extended position and a retracted position. The plunger pin extends at least partially outward of said housing at the fully extended position. A spool is within the cavity for movement along the same axis as the plunger pin, such that the spool and the plunger pin are movable with respect to each other to control fluid flow between the fluid inlet and the fluid outlet.

20 Claims, 16 Drawing Sheets

(56) References Cited

U.S. PATENT DOCUMENTS

| | | | |
|---|---|---|---|
| 2,549,886 A | 4/1951 | Buivid | |
| 2,588,166 A | 3/1952 | Sacchini | |
| 2,815,820 A * | 12/1957 | Papadakos | 416/143 |
| 2,927,655 A * | 3/1960 | Leslie et al. | 180/286 |
| 2,967,726 A | 1/1961 | Weston | |
| 3,067,825 A | 12/1962 | Chilman et al. | |
| 3,097,701 A | 7/1963 | Buivid | |
| 3,101,785 A | 8/1963 | Leoni | |
| 3,125,164 A | 3/1964 | Merrell | |
| 3,135,333 A | 6/1964 | Cruz et al. | |
| 3,175,620 A | 3/1965 | Newton | |
| 3,218,027 A * | 11/1965 | Richardson et al. | 415/14 |
| 3,256,780 A | 6/1966 | Riley et al. | |
| 3,369,611 A | 2/1968 | Vacca et al. | |
| 3,428,132 A | 2/1969 | Vacca et al. | |
| 3,438,447 A | 4/1969 | Ferris | |
| 3,484,175 A | 12/1969 | Vacca et al. | |
| 3,698,662 A | 10/1972 | Rostad | |
| 3,749,515 A | 7/1973 | Covington et al. | |
| 3,765,794 A | 10/1973 | Kudasch et al. | |
| 3,874,817 A | 4/1975 | Ferris | |
| 4,079,751 A | 3/1978 | Partridge et al. | |
| 4,080,988 A | 3/1978 | Robertson | |
| 4,186,766 A | 2/1980 | Snyder | |
| 4,232,699 A | 11/1980 | Hsu | |
| 4,252,504 A | 2/1981 | Covington et al. | |
| 4,268,222 A | 5/1981 | Bernard | |
| 4,284,387 A | 8/1981 | Ferris | |
| 4,338,965 A | 7/1982 | Garnjost et al. | |
| 4,340,086 A | 7/1982 | Hemm et al. | |
| 4,354,234 A | 10/1982 | MacLennan et al. | |
| 4,376,979 A | 3/1983 | Fowler et al. | |
| 4,427,340 A | 1/1984 | Metzger et al. | |
| 4,436,483 A | 3/1984 | Watson | |
| 4,466,775 A | 8/1984 | Martin | |
| 4,478,245 A | 10/1984 | Bender | |
| 4,506,691 A | 3/1985 | Tseo | |
| 4,528,628 A | 7/1985 | Fischer et al. | |
| 4,623,300 A | 11/1986 | Ruzicka | |
| 4,640,308 A | 2/1987 | Toelle | |
| 4,652,210 A | 3/1987 | Leman et al. | |
| 4,678,401 A | 7/1987 | Bradford et al. | |
| 4,786,236 A | 11/1988 | Hahn et al. | |
| 4,789,001 A | 12/1988 | Backe et al. | |
| 4,825,904 A | 5/1989 | Grau et al. | |
| 4,840,057 A | 6/1989 | Bingham | |
| 5,011,373 A | 4/1991 | Aubry et al. | |
| 5,018,431 A | 5/1991 | Gray et al. | |
| 5,085,315 A | 2/1992 | Sambell | |
| 5,244,002 A | 9/1993 | Frederick | |
| 5,249,926 A | 10/1993 | D'Anna et al. | |
| 5,386,716 A | 2/1995 | Thurston et al. | |
| 5,522,426 A | 6/1996 | Zutt et al. | |
| 5,787,915 A | 8/1998 | Byers et al. | |
| 5,819,783 A | 10/1998 | Blatt et al. | |
| 5,937,897 A | 8/1999 | Chatterjea et al. | |
| 6,032,899 A | 3/2000 | Mondet et al. | |
| 6,036,442 A | 3/2000 | Certain et al. | |
| 6,047,924 A | 4/2000 | Thomassin et al. | |
| 6,053,198 A | 4/2000 | Atkin et al. | |
| 6,164,323 A | 12/2000 | Smith et al. | |
| 6,168,137 B1 | 1/2001 | Paradis | |
| 6,213,712 B1 | 4/2001 | Muylaert | |
| 6,216,979 B1 | 4/2001 | Faure et al. | |
| 6,220,284 B1 | 4/2001 | Hayashi et al. | |
| 6,220,566 B1 | 4/2001 | Miller | |
| 6,261,062 B1 | 7/2001 | Amerling et al. | |
| 6,263,915 B1 | 7/2001 | Hayashi et al. | |
| 6,267,140 B1 | 7/2001 | Hayashi et al. | |
| 6,283,149 B1 | 9/2001 | Hayashi et al. | |
| 6,427,720 B1 | 8/2002 | Hayashi et al. | |
| 6,783,327 B1 | 8/2004 | Davis | |
| 6,789,570 B2 | 9/2004 | Beyrak et al. | |
| 6,860,450 B2 | 3/2005 | Muylaert et al. | |
| 2006/0137430 A1 | 6/2006 | Violette | |

FOREIGN PATENT DOCUMENTS

| | | |
|---|---|---|
| FR | 2158542 | 6/1973 |
| GB | 582802 | 11/1946 |
| JP | 2003252296 | 9/2003 |

OTHER PUBLICATIONS

International Preliminary Report on Patentability dated Nov. 10, 2011. PCT/US2010/026153.

* cited by examiner

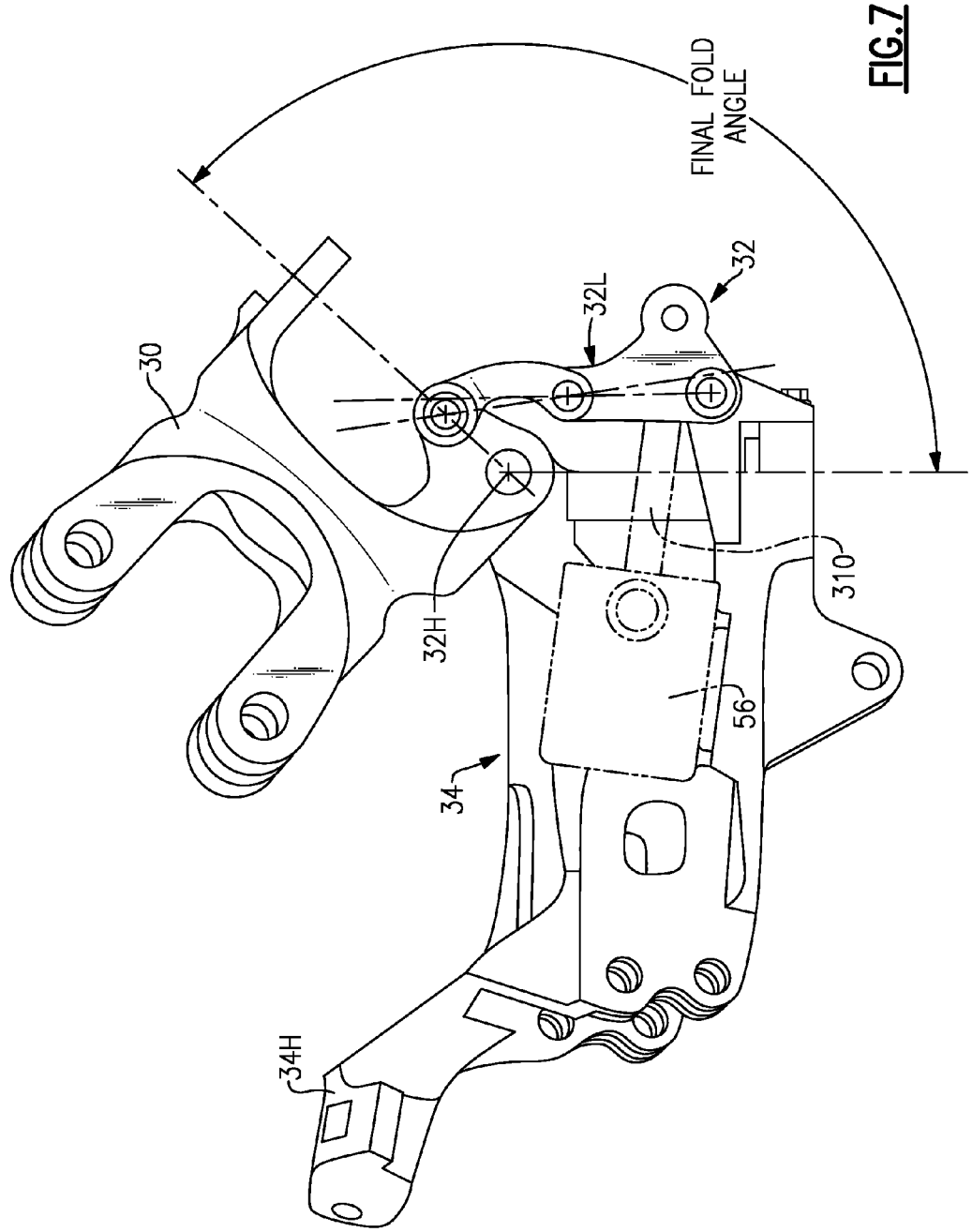

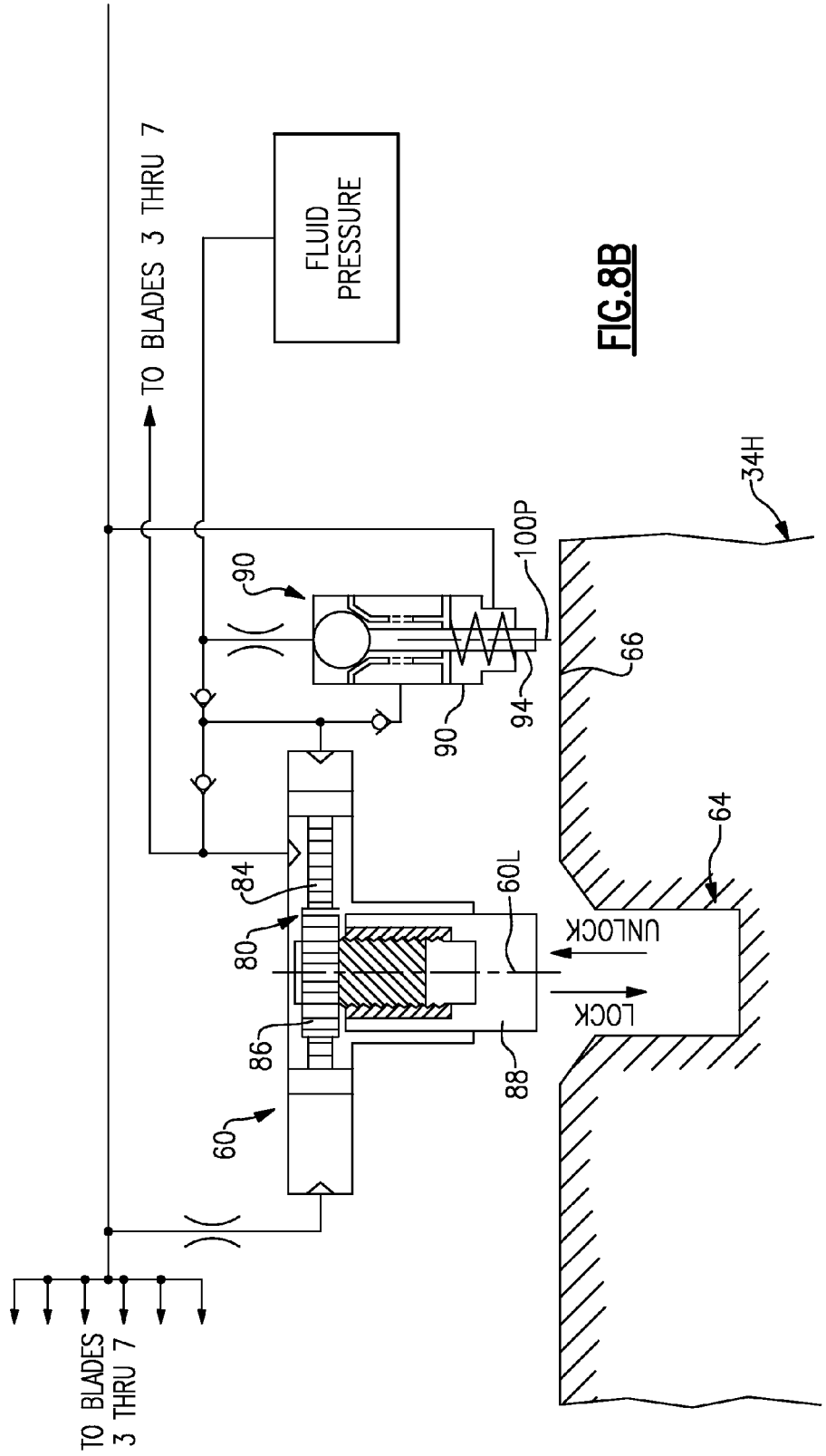

100
PROXIMITY SENSOR VALVE AND LOCK SYSTEM USING SAME

REFERENCE TO RELATED APPLICATIONS

The present disclosure claims the benefit of U.S. Provisional Patent Application No. 61/173,238, filed Apr. 28, 2009.

STATEMENT REGARDING FEDERALLY SPONSORED RESEARCH OR DEVELOPMENT

This disclosure was made with Government support under N00019-06-C-0081 awarded by The United States Navy. The Government has certain rights in this disclosure.

BACKGROUND

The present disclosure relates to a proximity sensor valve, and more particularly to a proximity sensor valve that mechanically prohibits fluid pressure from communicating with fold components, e.g. of a rotary-wing aircraft blade fold system, until the components are properly positioned.

Aircraft, particularly rotary-wing aircraft utilized for maritime flight operations, may be required to conduct operations from ships for extended periods of time. Shipboard space is generally at a premium, and the structural envelopes of aircraft may require a relatively significant allocation of such limited space. Furthermore, strategic and tactical considerations in the utilization of rotary-wing aircraft has led to a requirement for rotary-wing aircraft having main rotor assemblies that may be readily reconfigured for rapid deployment, routine transport, and/or stowage through reduction in structural envelope.

Several options are available to reduce the structural envelope of aircraft to facilitate rapid deployment, routine transport, stowage, and reduce the vulnerability thereof to environmental conditions. One option with rotary-wing aircraft is to design the main rotor assemblies thereof so that the main rotor blade assemblies fold relative to a main rotor hub assembly, and therefore, relative to the fuselage. A similar type approach is often taken with fixed wing aircraft. With this type of aircraft, all or a portion of the wing is typically folded with respect to the fuselage in order to reduce the overall envelope of the aircraft.

Various blade fold systems typically include pitch lock and hinge lock systems which often times react the loads of a folded blade with a retractable mechanical coupling. Verification of blade fold functionality often utilizes a combined hydraulic-electrical system in which blade fold position verification logic for the retractable mechanical couplings are related to the position of numerous electrical switches and sensors. Although effective, the presence of harsh environments, clearance issues, and vibration extremes may result in reduced reliability of the electrical sensors and switches over a period of time.

SUMMARY

A proximity sensor valve according to an exemplary aspect of the present disclosure includes a housing which defines a fluid inlet and a fluid outlet in communication with a cavity. A plunger pin within the cavity for movement along an axis, the plunger pin movable between an extended position and a retracted position, the plunger pin extends at least partially outward of the housing at the extended position. A spool is within the cavity for movement along the same axis as the plunger pin, such that the spool and the plunger pin are movable with respect to each other to control a fluid flow between the fluid inlet and the fluid outlet.

A fold system according to an exemplary aspect of the present disclosure includes a proximity sensor valve in fluid communication with a lock system, the proximity sensor valve operable to control operation of the lock system in response to extension of a plunger pin from the proximity sensor valve.

A method to confirm position of a displaceable member according to an exemplary aspect of the present disclosure includes locating a proximity sensor valve in fluid communication with a lock system, the proximity sensor valve operable to prevent fluid communication to the lock system in response to extension of a plunger pin from the proximity sensor valve.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a close-up phantom view of the fold actuator mechanism illustrating a final blade fold angle;

FIG. 8B is a schematic view of the pitch lock actuator and proximity sensor valve within the pitch lock system;

DETAILED DESCRIPTION

Figure 1:
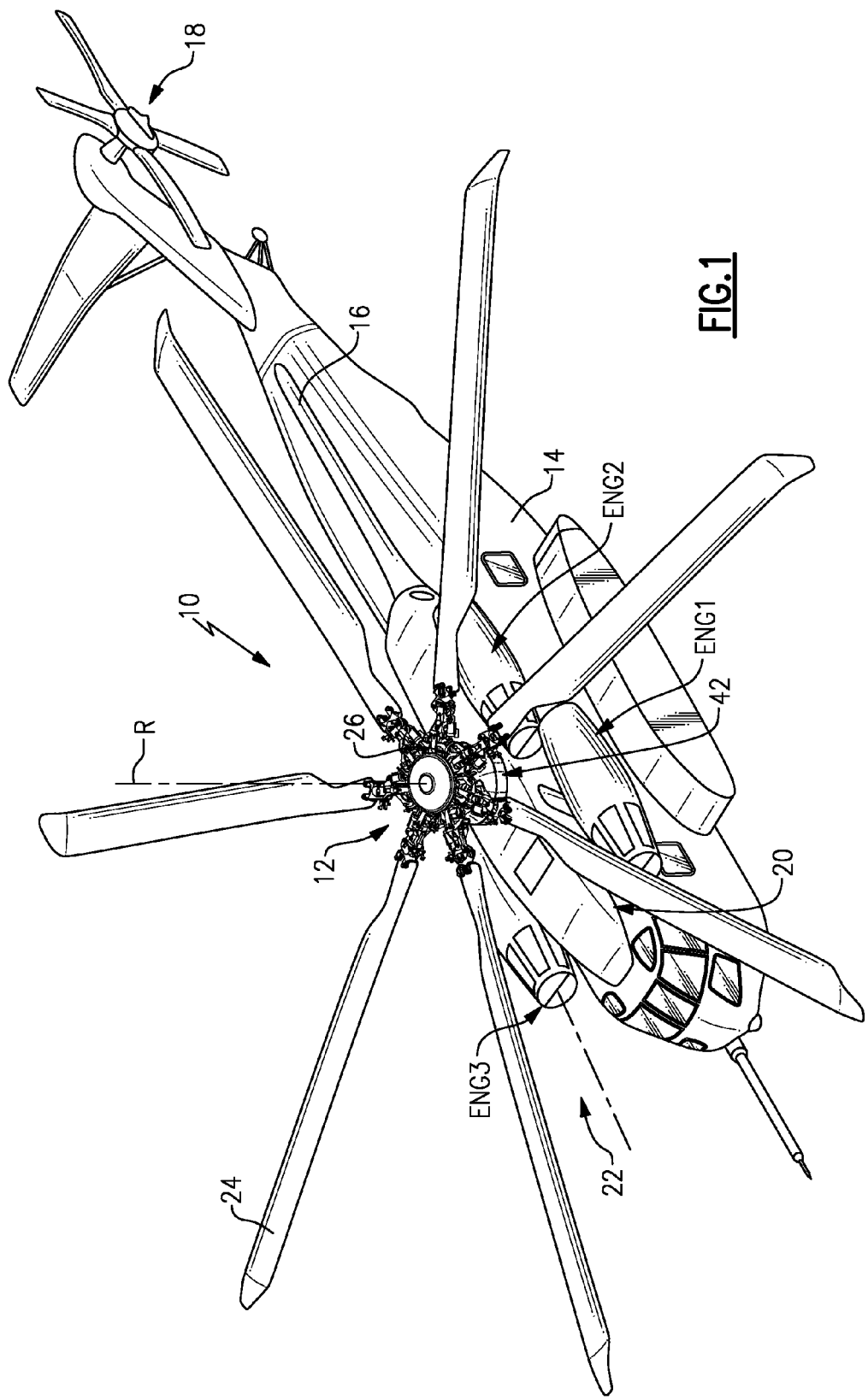
FIG. 1 is a general isometric view of an exemplary rotary wing aircraft embodiment for use with the present application with a main rotor system in a flight-ready (spread) position.

FIG. 1 schematically illustrates a rotary-wing aircraft 10 having a main rotor system 12. The aircraft 10 includes an airframe 14 having an extending tail 16 which mounts an anti-torque system 18. The main rotor system 12 is driven about an axis of rotation R through a main gearbox (MGB) 20 by a multi-engine powerplant system 22, here having three engine packages ENG1, ENG2, ENG3. The multi-engine powerplant system 22 generates the power available for flight operations, and such power is coupled to the main rotor system 12 and the anti-torque system 18 through the MGB 20.

To facilitate a fuller appreciation of the operation of a proximity sensor valve and a system using the same, a main rotor blade fold system is described herein. Specifically, functional features and characteristics are further described herein in terms of a CH-53K helicopter manufactured by Sikorsky Aircraft Corporation. One skilled in the art will appreciate that the discussion herein is generally applicable to other aircraft and machines which have displaceable members.

Figure 2A:
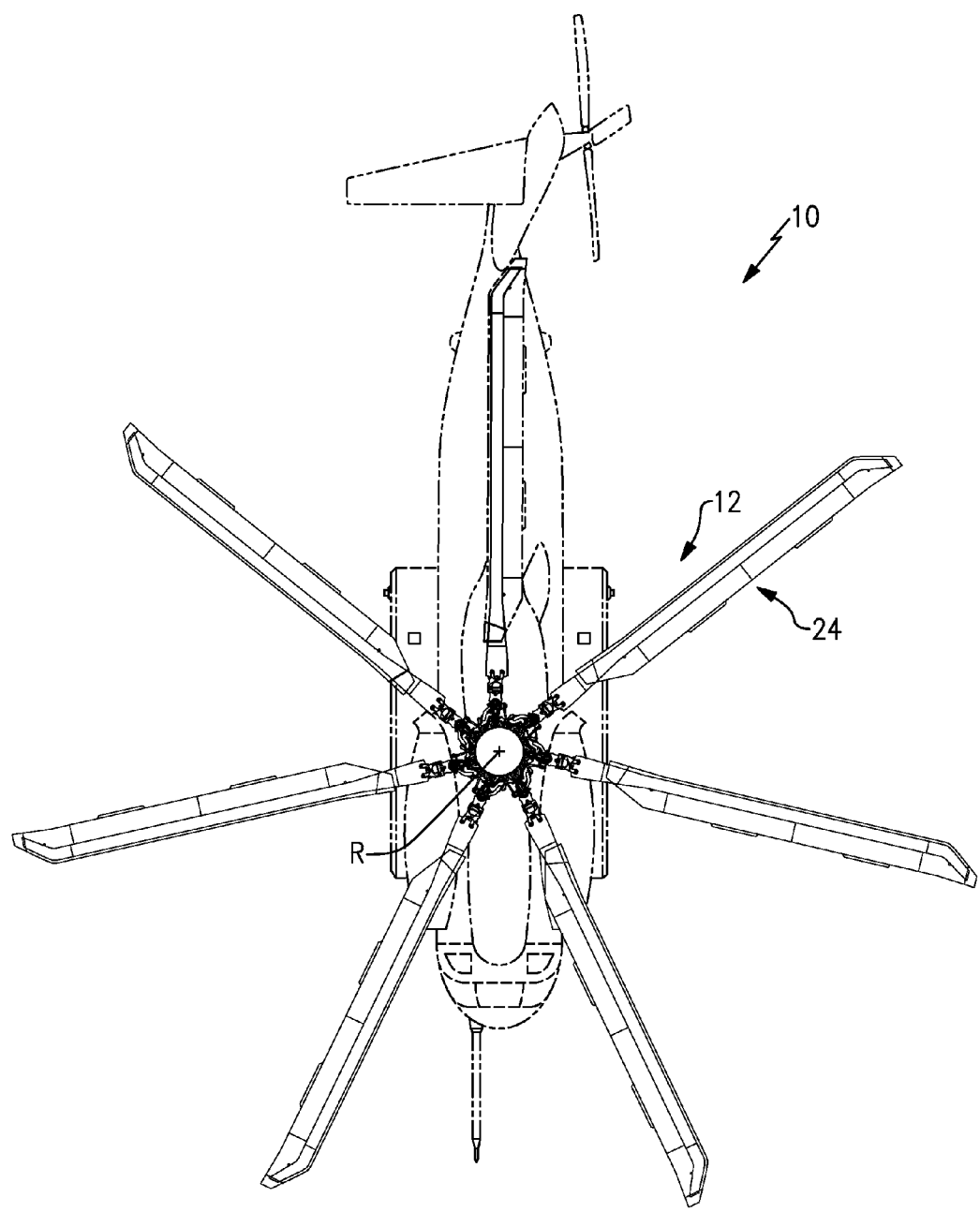
FIG. 2A is a top view of a main rotor system capable of folding the blades.

Referring to FIG. 2A, the main rotor system 12 includes seven rotor blade assemblies 24 each of which is mounted to the rotor hub 26 for rotation about an axis of rotation R. It should be understood that any number of rotor blade assemblies 24 may benefit herefrom. Furthermore, since each main rotor blade assembly 24 is generally alike, only one main rotor blade assembly 24 will be described in detail herein with the understanding that the description is generally applicable to each rotor blade assembly 24 and other displaceable members.

Figure 2B:
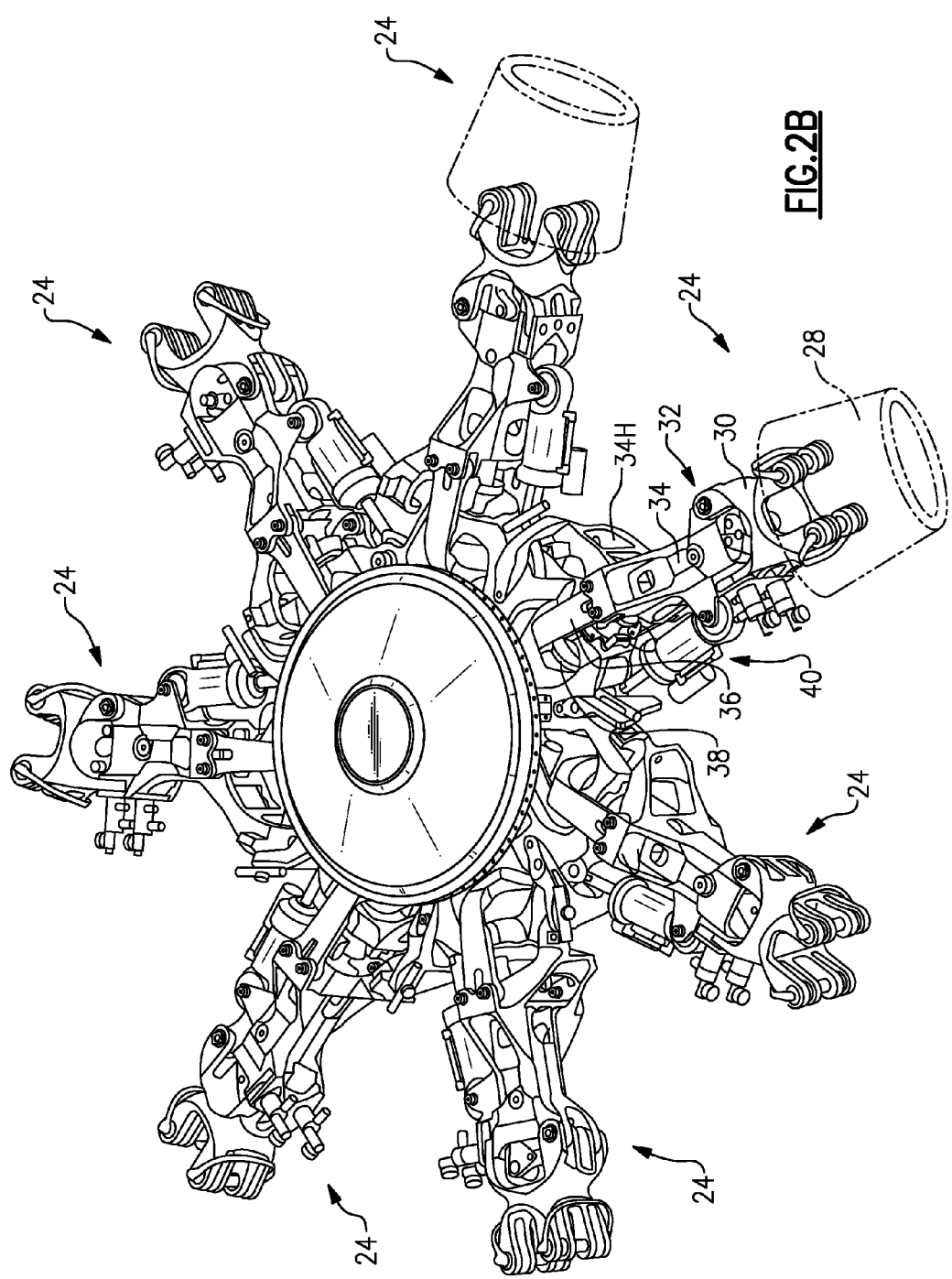
FIG. 2B is a top isometric view of a main rotor system capable of folding the blades.

Referring to FIG. 2B, each rotor blade assembly 24 generally includes a main rotor blade 28, a blade cuff 30, a hinge mechanism 32, a sleeve 34, a yoke 36, an elastomeric bearing 38 and a damper assembly 40. A pitch horn 34H extends from the sleeve 34 to receive pitch inputs from a swashplate 42 (FIG. 1).

The yoke 36 is mounted to the rotor hub 26 through the elastomeric bearing 38 such that the rotor blade assembly 24 may move in pitch, flap and lead/lag motions as generally understood. The damper assembly 40 reacts against the lead/lag motions of the blade assembly 24 and operates to dampen vibration.

Figure 2C:
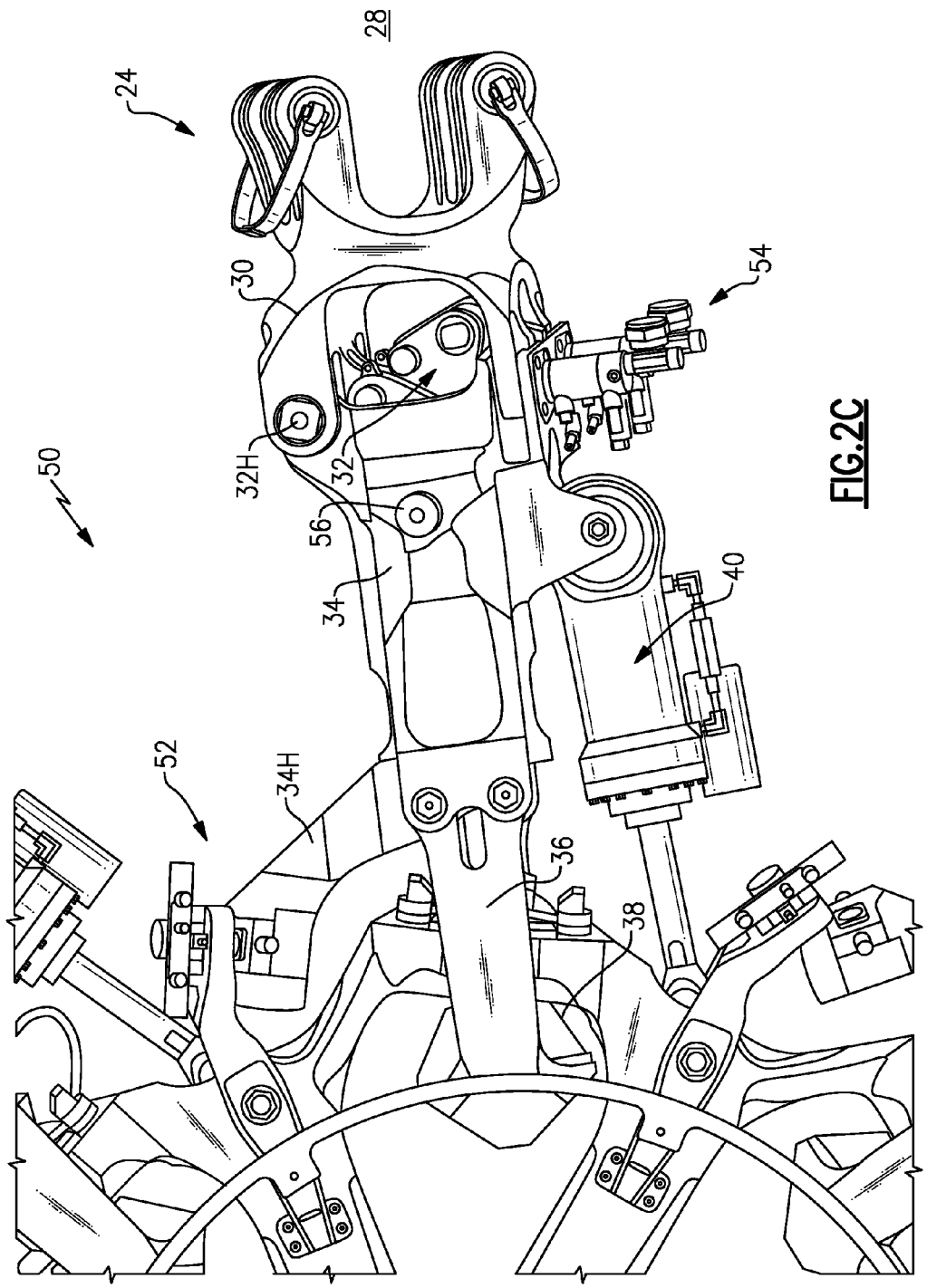
FIG. 2C is a close-up top view of a main rotor blade assembly attached to the main rotor hub.
Figure 3:
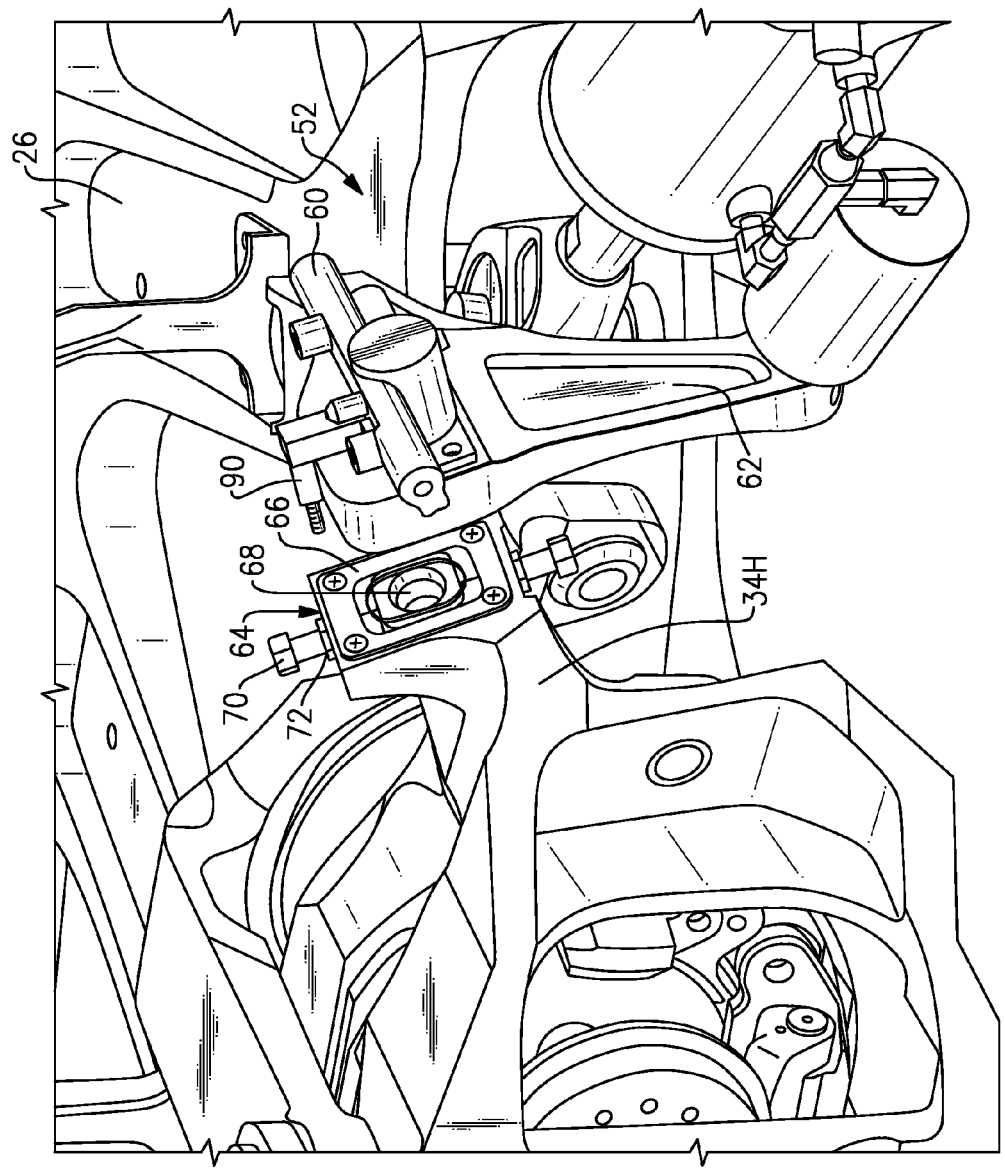
FIG. 3 is a close-up isometric view of a pitch lock system of a main rotor blade assembly.
Figure 4:
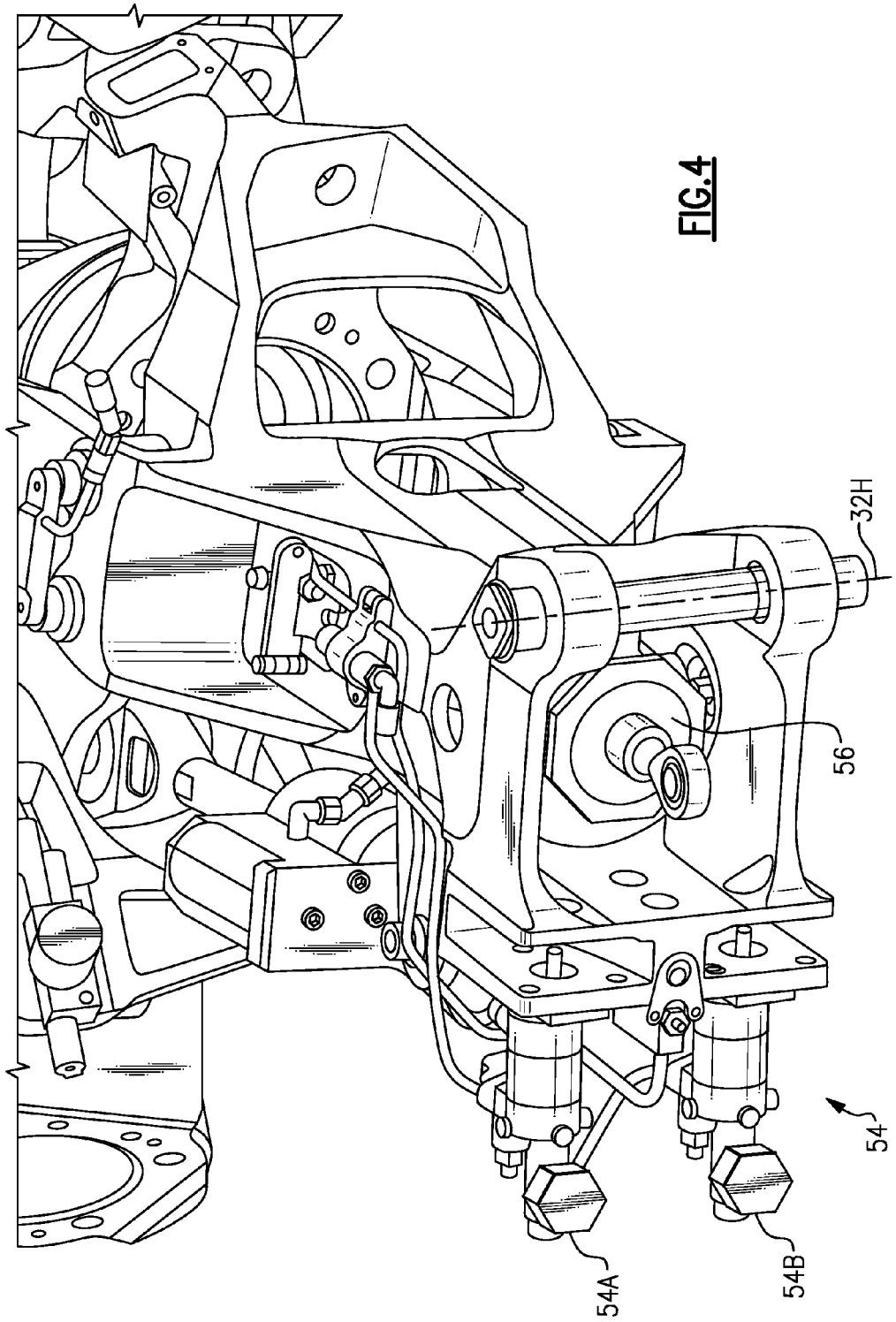
FIG. 4 is a close-up end view of a sleeve of a main rotor blade assembly illustrating a hinge lock system and a fold actuator system.

Referring to FIG. 2C, a blade fold system 50 for each rotor blade assembly 24 generally includes a pitch lock system 52 (also illustrated in FIG. 3), a hinge lock system 54 (also illustrated in FIG. 4), and a fold actuator system 56 (also illustrated in FIG. 4). A blade fold module 58 communicates with the pitch lock system 52, the hinge lock system 54, and the fold actuator system 56 (illustrated schematically in FIG. 5).

Figure 6:
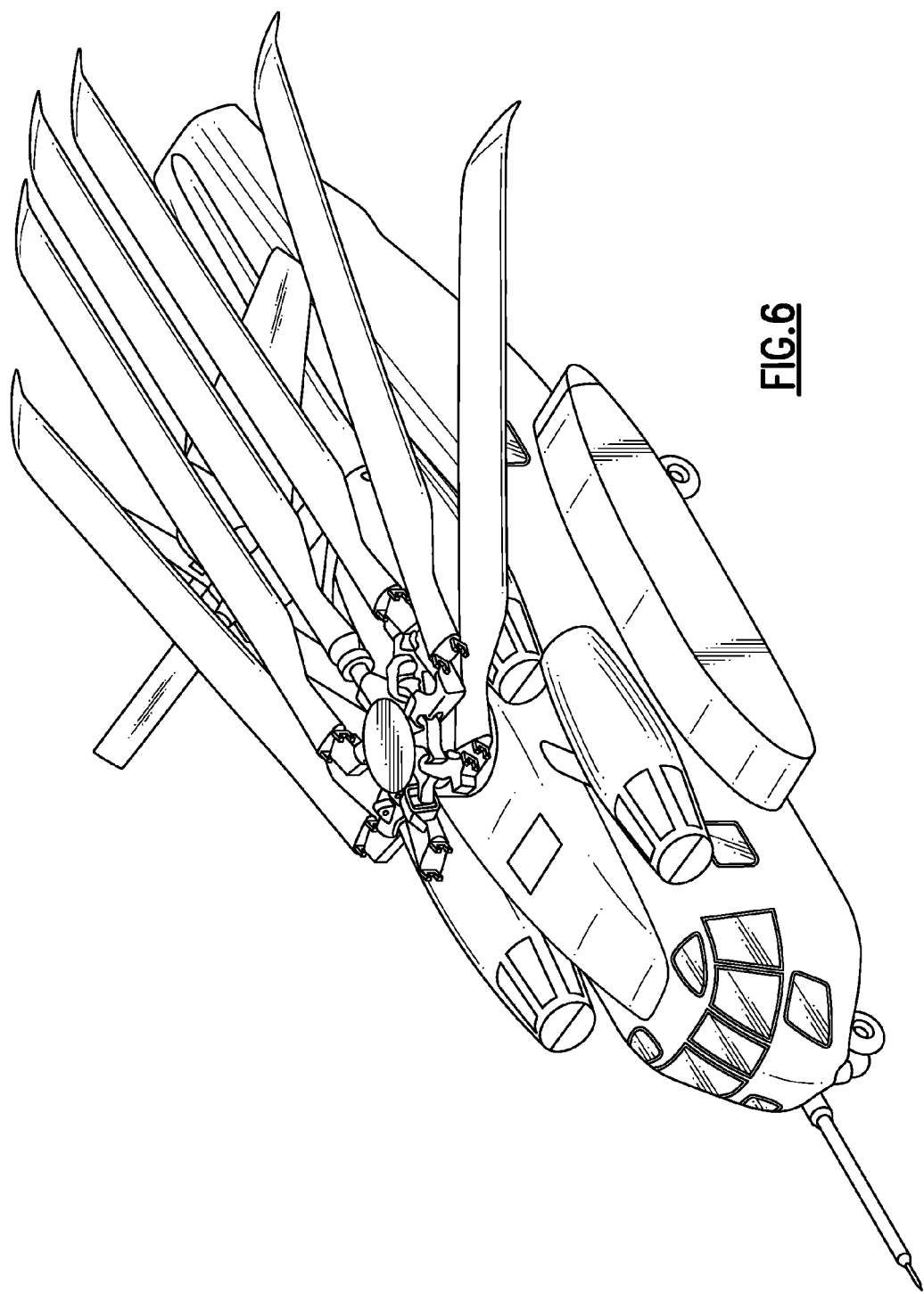
FIG. 6 is a general isometric view of an exemplary rotary wing aircraft embodiment for use with the present application with a main rotor system in a stowed (folded) position.

The blade fold module 58 operates to facilitate operation of, and provide an interface for aircrew and groundcrew operation of the blade fold system 50 functional sequence to selectively position each rotor blade assembly 24 in a particular folded position to minimize the aircraft envelope for stowage (FIG. 6). It should be understood by those skilled in the art with the benefit of this disclosure that the blade fold module 58 may be enacted in either dedicated hardware circuitry or programmed software routines capable of execution in a microprocessor-based electronics control embodiment. The blade fold module 58 typically includes a processor, a memory, and an interface. The processor may be any type of known microprocessor having desired performance characteristics. The memory may, for example only, include computer-readable medium which stores the data and control algorithms described herein. The interface may also facilitate communication with other avionics and systems.

The module 58 facilitates communication with electrical sensors and switches or a combination thereof within the pitch lock system 52, the hinge lock system 54 and the fold actuator system 56. In the disclosed, non-limiting embodiment, the operational logic disclosed herein is essentially provided completely through mechanical valving which essentially replaces numerous electrical sensors and switches typified by conventional, primarily electrical logic systems. It should be understood that the mechanical valving logic disclosed herein may be alternatively or additionally supplemented with an electrical logic system as well.

The pitch lock system 52 operates to lock and unlock each blade assembly 24 at a predetermined pitch position. The hinge lock system 54 operates to lock and unlock the blade cuff 30 for the rotor blade 28 with respect to the sleeve 34. The hinge lock system 54 in the disclosed, non-limiting embodiment includes a first hinge lock 54A and a second hinge lock 54B to provide redundant operation (see FIG. 10).

The blade fold actuator system 56 operates to fold and unfold the blade cuff 30 with respect to the sleeve 34 through the hinge mechanism 32 (FIG. 7). It should be understood that the pitch lock system 52, high lock system 54, and blade fold actuator system 56 may be comprised of various linear and rotary actuators in lieu of what is shown and described herein.

The hinge mechanism 32 provides for a predetermined final blade fold angle through the respective hinge linkage 32L about a hinge axis 32H. Notably, minimal strain is placed on the elastomeric bearing 38 (see FIG. 2C) as the pitch lock system 52 locks each sleeve 34 to the rotor hub 26 (see FIG. 1) at a predetermined pitch angle.

Referring to FIG. 3, the pitch lock system 52 generally includes a pitch lock actuator 60 mounted to a bracket 62 which extends from the rotor hub 26 adjacent to the pitch horn 34H. A pitch lock pin receptacle 64 on each pitch horn 34H operates in combination with the respective pitch lock actuator 60. The pitch lock actuator 60 remains clear of the pitch horn 34H throughout pitch, flap and lead/lag flight motions when the rotor blade assembly 24 is facilitating flight. When the aircraft is on the ground and the main rotor system 12 is at rest, the damper assembly 40 (see FIG. 2B) drives the sleeve 34 (see also FIG. 2B), and therefore the pitch lock pin receptacle 64 on each pitch horn 34H, into proximity of the pitch lock actuator 60, where each pitch horn 34H remains while the rotor blade assembly 24 is pitch locked/unlocked and is stowed in the folded position.

The pitch lock pin receptacle 64 may be generally defined by a striker plate 66 and a pitch lock pin receiver 68. The striker plate 66 protects the pitch horn 34H from potential damage incurred by the pitch lock actuator 60. The pitch lock pin receptacle 64 allows for predetermined adjustment of the pitch lock pin receiver 68 through an adjustment fastener 70 and jam nut 72 arrangement.

Figure 8A:
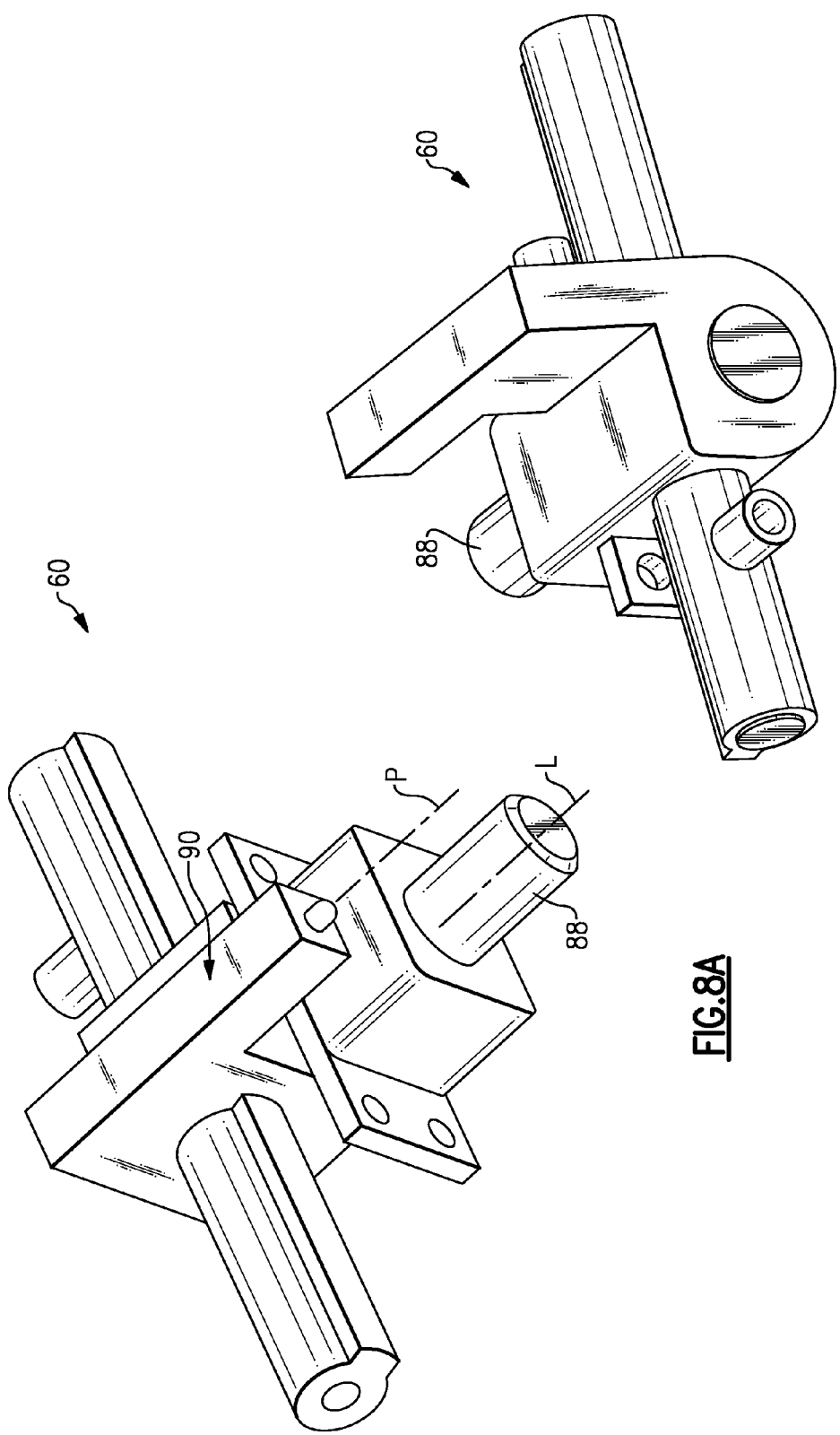
FIG. 8A is a close-up isometric view of a pitch lock actuator (of the pitch lock system) with an integral proximity sensor valve.

Referring to FIGS. 8A and 8B, the pitch lock actuator 60 generally includes a hydraulic drive system such as a rack-and-pinion arrangement which utilizes a rack 84 to rotate a pinion 86, thereby extending and retracting a pitch lock pin 88 along an axis 60L (FIG. 8B). It should be understood that other rotary and linear hydraulic drive system arrangements may be alternatively utilized. While it should be understood that the proximity sensor valve concept can be adapted to, and utilized in either a hydraulic or pneumatic conduit system, for simplicity reasons, the present disclosure will merely address the hydraulic application. That being said, the words "hydraulic" and "pneumatic" should be considered interchangeable from here forward, as should the words "fluid" and "air" or "gas".

The pitch lock actuator 60 relies on a proximity sensor valve 90 which may be integrated therewith to permit or prevent extension of the pitch lock pin 88. That is, the proximity sensor valve 90 operates to permit or prevent hydraulic fluid pressure from being communicated to the pitch lock actuator 60. The proximity sensor valve 90 although operational as a hydraulic logic sensor for the pitch lock actuator 60 in the disclosed non-limiting embodiment, may alternatively operate in a pneumatic system as previously described.

The proximity sensor valve 90 is discussed in the disclosed non-limiting embodiment for use with the main rotor blade fold system 50 (see FIGS. 2C and 5); however, the proximity sensor valve 90 may alternatively benefit various aerospace fold systems such as tail fold locking, wing fold, as well as other, non-aerospace, mechanical, displaceable member type systems.

Since the proximity sensor valve 90 mechanically prevents extension of the pitch lock pin 88, the proximity sensor valve 90 facilitates simplification of the entire blade fold system. The proximity sensor valve 90 provides a robust verification of the completion of hydraulic functionality as opposed to sole reliance on electrical switches and sensors. Due to the presence of harsh environments, clearance issues, electrical power failures, and vibration, electrical switches and sensors may prove less reliable and possibly heavier overall in the aerospace environment.

The proximity sensor valve 90 thereby mechanically ensures that a downstream, hydraulic actuator is safe to deploy without the potential risk of damaging its receptacle or the actuator itself. The proximity sensor valve 90 can also serve, in an indirect manner, as verification that proper system functionality has been achieved. This is because without the proximity sensor valve 90, the adjoining actuator could fully extend, but not necessarily accomplish its end goal of engaging the receptacle. In other words, since the proximity sensor valve 90 has been strategically and sufficiently positioned, and has accordingly allowed the pitch lock actuator 60 to extend, then the proximity sensor valve 90 must have detected or "sensed" the presence of the pitch lock pin receptacle 64. In this manner, should the pitch lock pin 88 then fully extend, logic dictates that the pitch lock pin 88 must have been received by the pitch lock pin receptacle 64, unless the proximity sensor valve 90 or the fluid communication between it and the pitch lock actuator 60 have been compromised in some way.

Figure 9A:
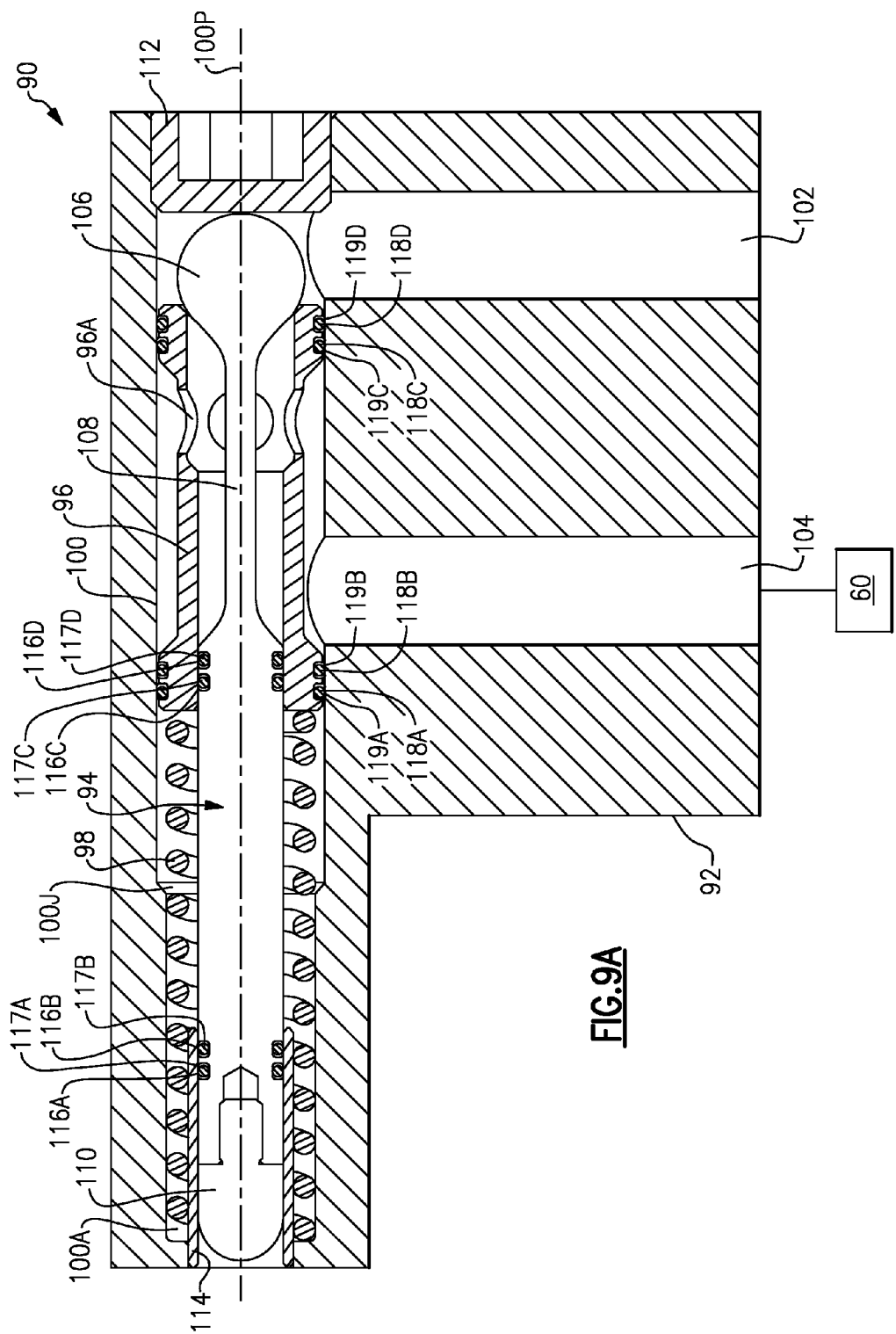
FIG. 9A is a sectional view of a retracted proximity sensor valve with a biasing member, but no retract assistance.

Referring to FIG. 9A, the proximity sensor valve 90 generally includes a housing 92, a plunger pin 94, a spool 96 and, in most cases, a biasing member 98. The plunger pin 94, the spool 96 and the biasing member 98 are axially arranged within a cavity 100 along an axis 100P. A fluid inlet 102 and a fluid outlet 104 provide for fluid communication with the cavity 100 to receive a high pressure fluid such as hydraulic fluid. The fluid inlet 102 may be in fluid communication with a high pressure fluid source and the fluid outlet 104 may be in fluid communication with a device which is to be operated by the high pressure fluid. The purpose or function of the proximity sensor valve 90 is only served if the proximity sensor valve 90 is physically proximate a feature it is intended to "sense".

Though the housing 92 may be alternatively packaged separately, the housing 92 may be mounted to or integral with the pitch lock actuator 60 (FIG. 8A) such that the fluid inlet 102 and the fluid outlet 104 are in direct fluid communication with the hydraulic drive system 80 (FIG. 8B). In one non-limiting embodiment, the axis 100P is generally parallel to the lock axis 60L (FIG. 8B).

The plunger pin 94 includes an enlarged end section 106, a reduced diameter section 108 and a probe section 110. Although a semi-spherical end section is illustrated in the disclosed non-limiting embodiment, it should be understood that other geometric shapes larger than the reduced diameter section 108 such as conics, spheres and others may be alternatively utilized. The spool 96 includes transverse apertures 96A and generally extends for a length greater than the distance between the enlarged end section 106 and the probe section 110. The enlarged end section 106 is of a diameter sufficient to seal the spool 96 when in contact therewith. A cap 112 operates to seal the cavity 100 while a sleeve 114 provides a guide for the probe section 110. The sleeve 114 can also serve to support or guide a portion of the biasing member 98.

The probe section 110 may include a sacrificial tip 110T which may be manufactured of a non-metallic material as compared to the plunger pin 94 which may be manufactured of a high-strength metallic material. The sacrificial tip 110T operates to increase engagement compliance with a contact surface such as the striker plate 66. The sacrificial tip 110T may also allow for easy replacement of a wearable part or feature within the pitch lock system 52. In addition, should the damper assembly 40 fail to sufficiently position the blade assembly 24 prior to the pitch lock system 52 being turned on, then the sacrificial tip 110T may be severed, damaged, or destroyed by the displaceable member in lieu of the remainder of the proximity sensor valve 90 or the pitch lock pin 88. In such a scenario, the proximity sensor valve 90 would prohibit said pitch lock pin 88 from extending. Therefore, the pitch lock system 52 would have to be unlocked or relieved before the pitch lock pin 88 in question, and any more downstream thereof could be extended (unless a manual override of the pitch lock actuator 60 was utilized).

Seal grooves 116A-116D within the probe section 110 support seals 117A-117D which seal the plunger pin 94 relative to the spool 96 and the sleeve 114, and permit axial movement along axis 100P within the cavity 100. Seal grooves 116A, 116B support seals 117A, 117B which seal the probe section 110 relative to the sleeve 114. Seal grooves 116C, 116D support seals 117C, 117D which operate to seal the probe section 110 relative to the spool 96. Seal grooves 118A-118D within an outer diameter of the spool 96 support seals 119A-119D which operate to seal the spool 96 relative to the cavity 100 and permit axial movement along axis 100P within the cavity 100. Seal grooves 118A, 118B support seals 119A, 119B which separate the high pressure fluid in the spool 96 end of the cavity 100 from the lower pressure fluid in the probe section 110 of the cavity 100 during extension (and vice versa during retraction, if retraction assistance is incorporated). Seal grooves 118C, 118D support seals 119C, 119D which are located between the fluid inlet 102 and the fluid outlet 104. Seals 119C, 119D remain between the fluid inlet 102 and the fluid outlet 104 irrespective of the plunger pin 94 and spool 96 movement along axis 100P.

The biasing member 98 is located about the plunger pin 94 to react the spool 96 with an end wall 100A of the cavity 100 adjacent to the sleeve 114. The plunger pin 94 extends generally for the length of the cavity 100. The biasing member 98 operates to bias the spool 96 toward the cap 112, based on fluid pressure, e.g., from the fluid inlet 102. Because of this, the spool 96 is forced into contact with the enlarged end section 106, thereby biasing the plunger pin 94 into the cap 112. That is, when fluid pressure in the fluid inlet 102 reaches a predetermined low value, the biasing member 98 biases the spool 96 which, in turn, biases the plunger pin 94 into the cap 112 which operates as a stop for the plunger pin 94. It should also be noted that while the particular embodiment is shown as is, either the cap 112 or the sleeve 114 could be designed integral to the housing 92, and that the sleeve 114 could be integrated with the end wall 100A to serve as a removable "cap" at that end of the housing 92 as well.

Figure 9B:
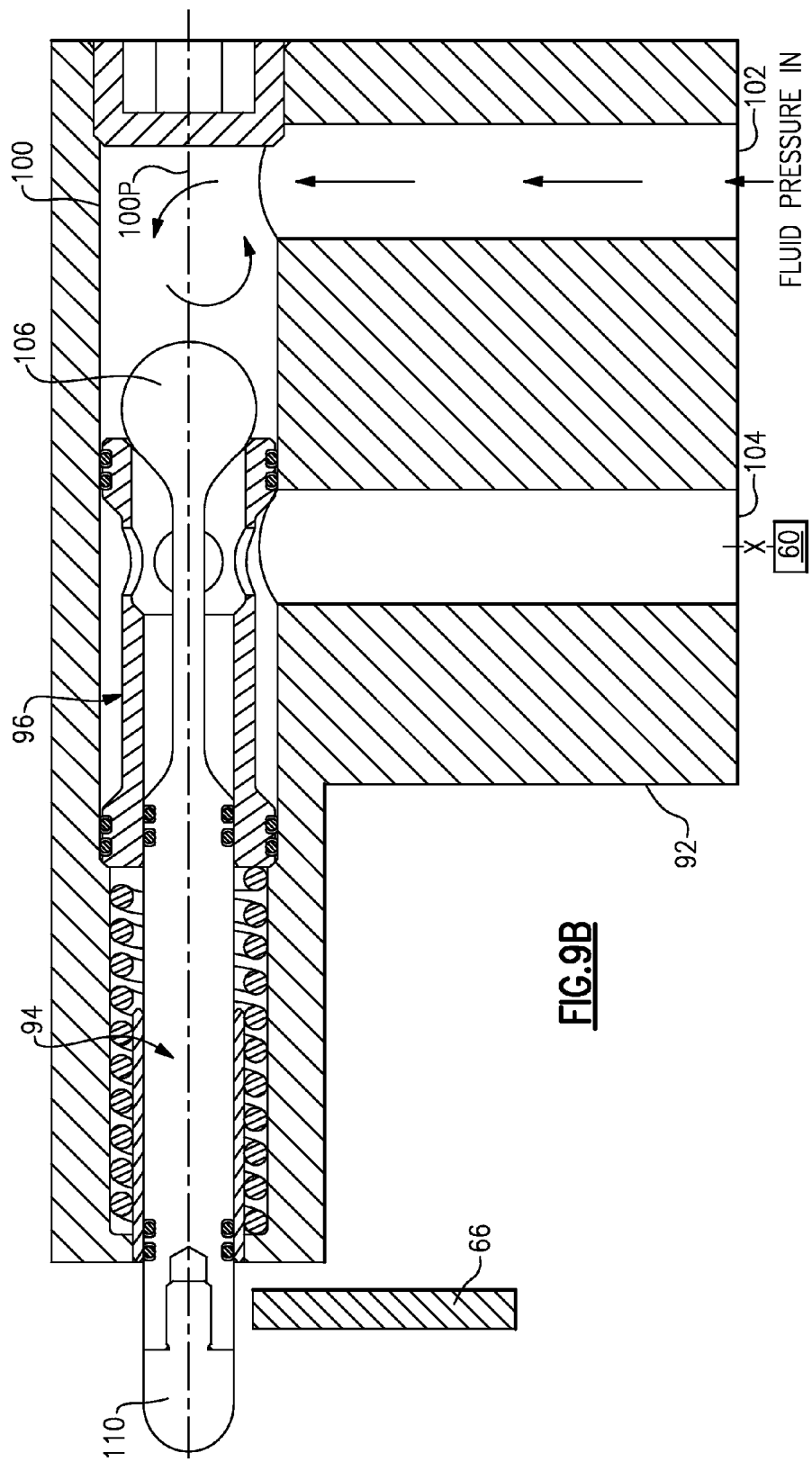
FIG. 9B is a sectional view of an extended proximity sensor valve in a fluid inhibit position to block fluid operation of pressurized fluid-driven systems downstream thereof.

Referring to FIG. 9B, when there is no feature present to block extension of the plunger pin 94 and pressurized hydraulic fluid is communicated into the cavity 100 through the fluid inlet 102, the pressurized hydraulic fluid acts on the enlarged end section 106 of the plunger pin 94 and the spool 96. Since the plunger pin 94 is free to move along axis 100P, and since there is more surface area on the cap 112 side of the enlarged end section 106 of the plunger pin 94 than on the spool 96 side of the enlarged end section 106, the hydraulic force on the cap 112 side of the enlarged end section 106 overcomes the force on the spool 96 side, and the plunger pin 94 is driven into the spool 96 as they move in unison in cavity 100 along axis 100P. This continues until the spool contacts the spool stop 100S (which could be located between the fluid inlet 102 and fluid outlet 104 as an added sealing feature between the two) in the cavity 100. In this condition, the probe section 110 extends out of the housing 92 to the extent of its full potential reach. The enlarged end section 106 of the plunger pin 94 and the spool 96 thereby operate to block the cavity 100 where the fluid outlet 104 resides. That is, if there is no feature to block extension of the plunger pin 94, the proximity sensor valve 90 will block fluid flow from proceeding out of the fluid outlet 104 due to the interface between the spool 96 and the enlarged end section 106 of the plunger pin 94 and the interface between the seals 119C, 119D and the cavity 100 wall.

In the disclosed, non-limiting embodiment, the prevention of fluid communication is illustrated as when the probe section 110 of the plunger pin 94 is not in contact with the striker plate 66, which would indicate that the pitch lock pin 88 of the pitch lock actuator 60 is not aligned with the pitch lock pin receptacle 64 (FIG. 3). The proximity sensor valve 90 will thereby block fluid flow from proceeding out of the fluid outlet 104 and into the pitch lock actuator 60. Therefore, the pitch lock actuator 60 will not be operated. Also, any systems downstream thereof, such as the next pitch lock actuator 60 for the adjacent rotor blade assembly 24 which may be daisy-chained thereto, could also be prevented from operation by said blocked/inoperable pitch lock actuator 60.

Figure 9C:
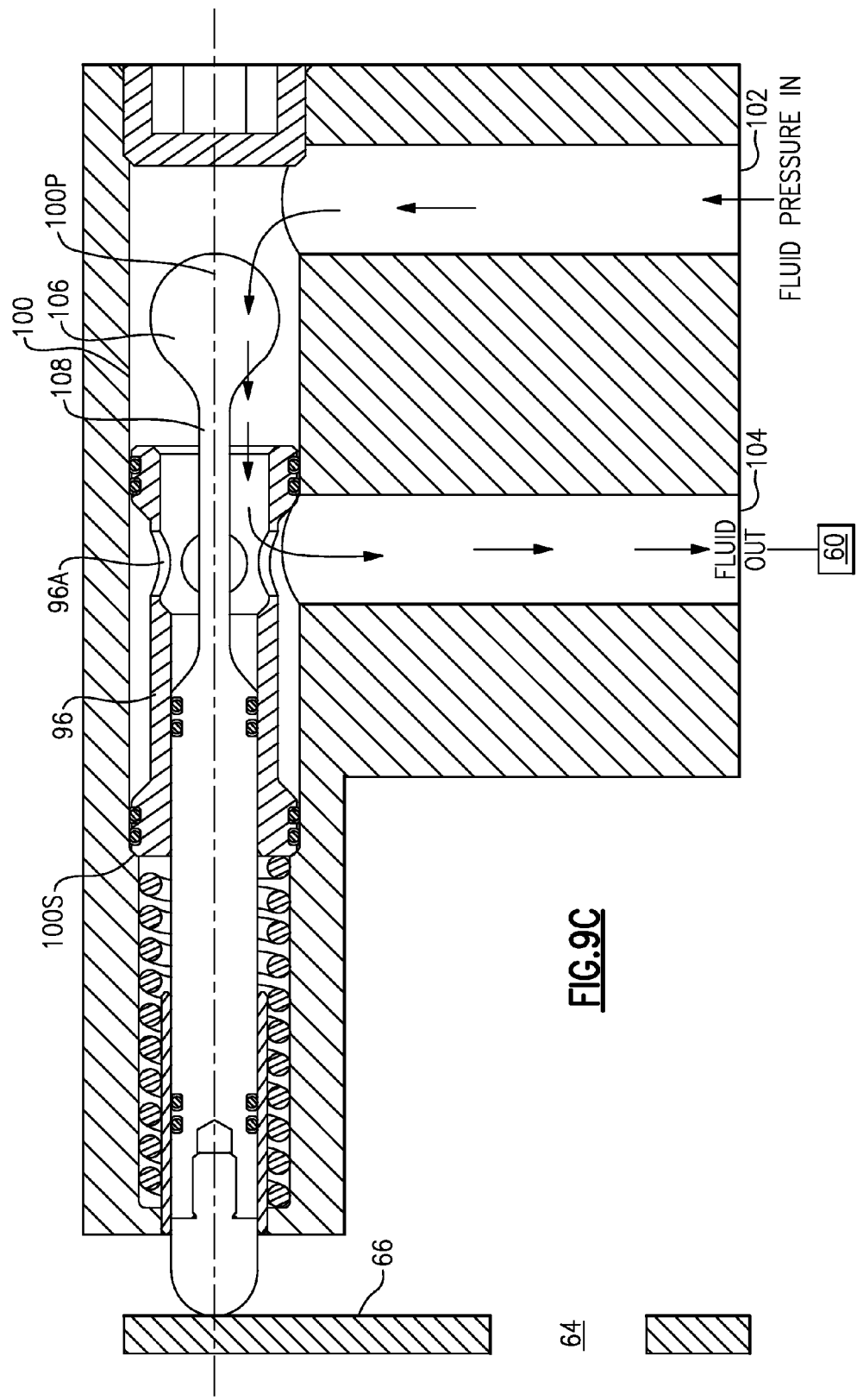
FIG. 9C is a sectional view of an extended proximity sensor valve in a fluid communication position to permit fluid operation of pressurized fluid-driven systems downstream thereof.

Referring to FIG. 9C, when there is a feature present to block extension of the plunger pin 94 and pressurized hydraulic fluid is communicated into the cavity 100 through the fluid inlet 102, the pressurized hydraulic fluid acts on the enlarged end section 106 of the plunger pin 94 and the spool 96. Since the plunger pin 94 is now restrained from movement along axis 100P, the pressurized hydraulic fluid flows around the enlarged end section 106 to drive the spool 96 within the cavity 100 along axis 100P until the spool contacts the spool stop 100S. In this condition, the pressurized hydraulic fluid flows around the enlarged end section 106 along the reduced diameter section 108 and into the spool 96. The pressurized hydraulic fluid flows out the transverse apertures 96A and exits the cavity 100 through the fluid outlet 104. That is, when a feature blocks extension of the plunger pin 94, the proximity sensor valve 90 will permit fluid flow from the fluid inlet 102 to, and through the fluid outlet 104. The pressurized hydraulic fluid may be thereby utilized to operate a downstream system such as the pitch lock actuator 60 in the disclosed non-limiting embodiment.

In the disclosed, non-limiting embodiment, the allowance of fluid communication is illustrated as when the probe section 110 of the plunger pin 94 is in contact with the striker plate 66 which would indicate that the pitch lock pin 88 of the pitch lock actuator 60 is properly aligned with the pitch lock pin receptacle 64 (FIG. 3). The proximity sensor valve 90 will thereby permit fluid flow out of the fluid outlet 104 and into the pitch lock actuator 60. Therefore, the pitch lock actuator 60 will be operated to extend the pitch lock pin 88 into the pitch lock pin receptacle 64 to thereby pitch lock the rotor blade assembly 24. Operation of the hinge lock system 54 and blade fold actuator system 56 may then proceed once all daisy-chained pitch lock actuators 60 have been engaged.

Baseline Hydraulic Pitch Lock and Blade Fold Order of Operations

Pitch Lock/Blade Fold

Figure 5:
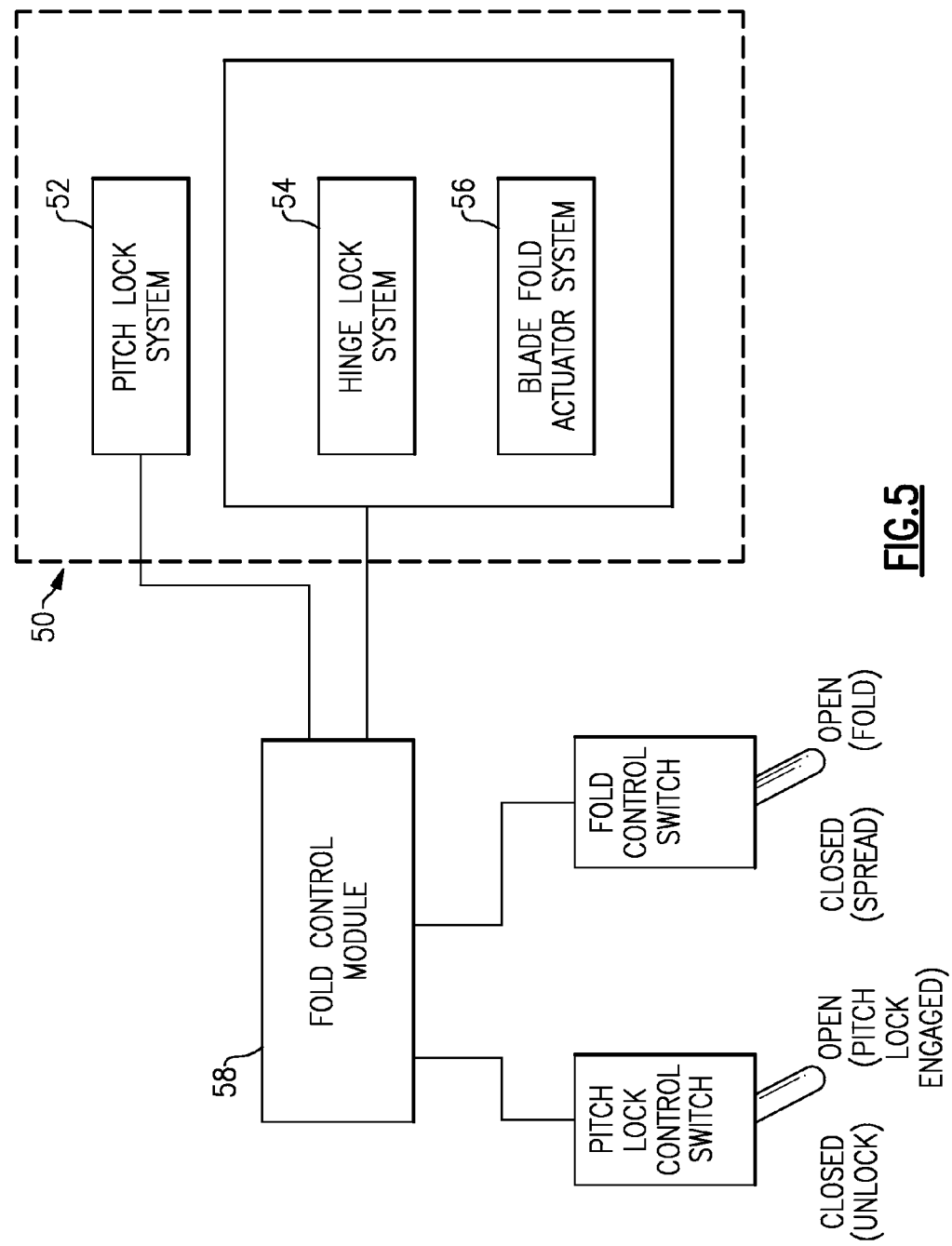
FIG. 5 is a block diagram of a fold system.
Figure 10:
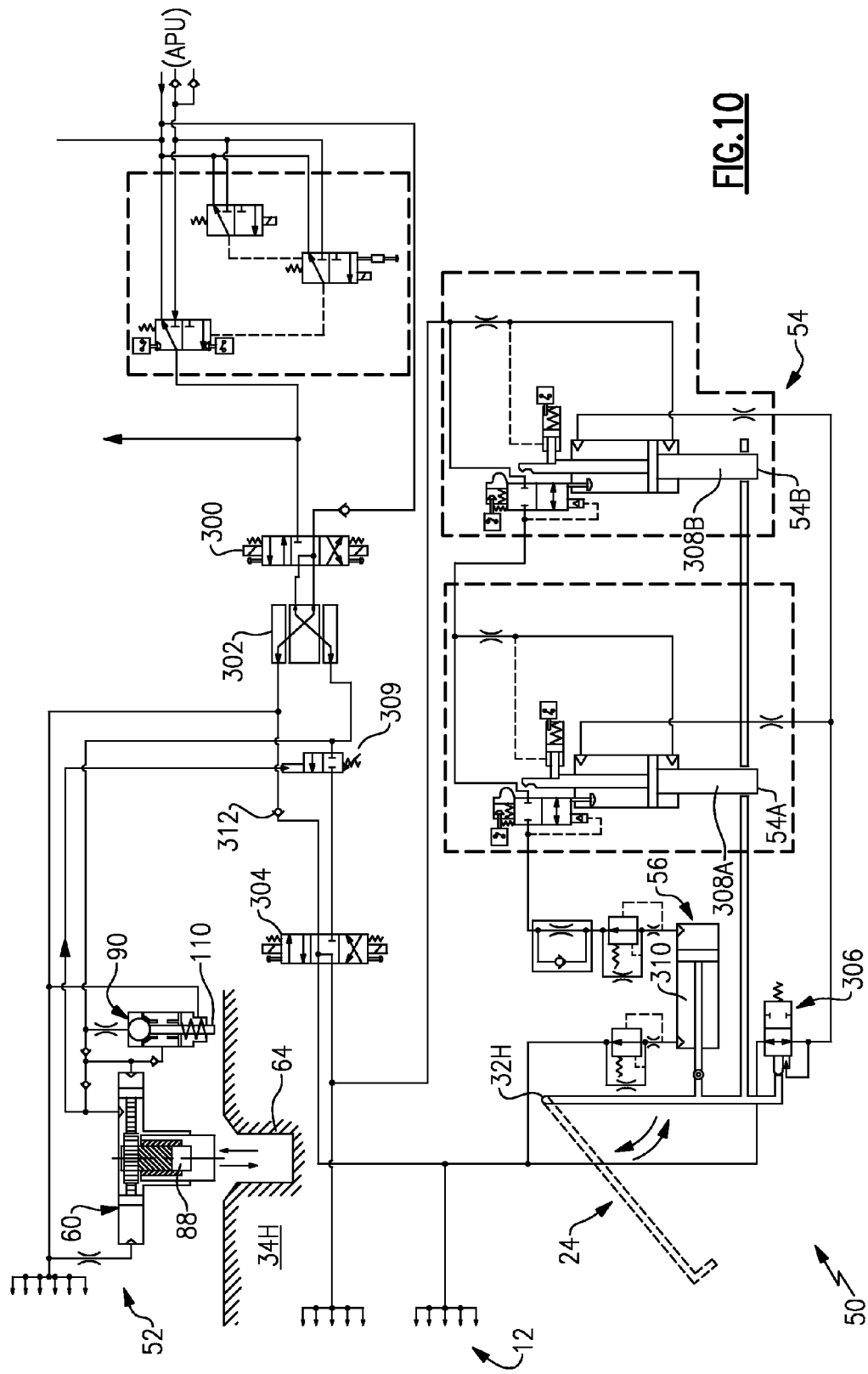
FIG. 10 is a schematic of a pitch lock, hinge lock, and blade fold system for a main rotor system of a rotary-wing aircraft.

In one operational example of the blade fold system 50, the main rotor system 12 is folded as follows with reference to FIG. 10. Following main rotor system braking/wind-down, the main rotor system 12 is indexed via an Auxiliary Power Unit (APU) powered utility system and the main rotor gearbox 20 to a position that locates one of the main rotor blade assemblies 24, which is typically non-folding, directly over the tail 16 (FIG. 2A). During this operation, and while the main rotor system 12 comes to rest, each pressurized damper assembly 40 pre-leads each rotor blade assembly 24 such that the pitch lock pin receptacle 64 on each pitch horn 34H is positioned proximate the respective pitch lock actuator 60. Once the pitch horn receptacles 64 are in position to receive the pitch lock pin 88, the crew may activate a pitch lock control switch of the blade fold module 58 (FIG. 5). The solenoid-operated and/or manually-operated pitch lock control valve 300 (FIG. 10) is switched from the closed, or "relief" position to a "pitch lock engage", or open position. Pressurized fluid from, for example, the APU-powered utility system is then communicated to a distribution manifold through a hydraulic coupling 302, both of which may be located on the rotor hub 26 (FIG. 2B). From the distribution manifold, the pressurized fluid flows out to the first of the pitch lock actuators 60 that are daisy-chained in tandem as well as to a pressure-operated/assisted fold control check valve 309 which is spring-loaded to the closed position. This fluid drives each of the pitch lock pins 88 into their respective blade pitch horn receptacles 64.

It should be noted, at this point, that the presence of the pressure-operated/assisted fold control check valve 309 is not required for successful system functionality. In other words, once the pressurized fluid that is used to extend the proximity sensor valves 90 and pitch lock actuators 60 for all of the rotor blade assemblies 24 has been communicated through the daisy-chain circuitry, the fluid can then be routed directly to the fold control valve 304 to save weight and increase system reliability. Alternatively or in addition thereto, the pressure-operated/assisted fold control check valve 309 may be utilized to bypass the pressure and flow losses induced by communication of the pressurized fluid through the pitch lock system 60 daisy-chain circuitry prior to delivery to the hinge lock system 54 and blade fold system 56. In this manner, "fresh" pressurized fluid from the hydraulic coupling 302 is communicated directly to the fold control valve 304 when the "depreciated" pressurized fluid from the pitch lock system 60 daisy-chain circuitry is used to open the pressure-operated/assisted fold control check valve 309. In other words, the pressurized fluid from the hydraulic coupling 302 may be split in two directions, one path passing through the pitch lock system daisy-chain circuitry, while the other path is communicated to the pressure-operated/assisted fold control check valve 309. Once the portion of the fluid devoted to the pitch lock system 60 has completed the pitch lock operation, that fluid then serves to open the pressure-operated/assisted fold control check valve 309 and thereby allows the awaiting pressurized fluid from the hydraulic coupling 302 to pass through and on to the fold control valve 304.

Notably, in the disclosed non-limiting embodiment, the proper position of the pitch lock pin receptacle 64 is confirmed when the probe section 110 of the plunger pin 94 is in contact with the striker plate 66 (FIG. 9C) so that the pitch lock pin 88 of the pitch lock actuator 60 is properly aligned with the pitch lock pin receptacle 64. The proximity sensor valve 90 with the plunger pin 94 partially extended will thereby permit fluid flow out of the fluid outlet 104 and the pitch lock actuator 60 will extend the pitch lock pin 88 into the pitch lock pin receptacle 64 to thereby pitch lock the rotor blade assembly 24. When the probe section 110 of the plunger pin 94 is not in contact with the striker plate 66 (FIG. 9B) and is fully extended, logic dictates that the pitch lock pin 88 of the pitch lock actuator 60 is not aligned with the pitch lock pin receptacle 64. The proximity sensor valve 90 will thereby block fluid flow from proceeding out of the fluid outlet 104 and the pitch lock actuator 60 will not be operated. Also, any systems downstream thereof, such as the next pitch lock actuator 60 for the next rotor blade assembly 24 which may be daisy-chained to the improperly positioned, and therefore inoperable, pitch lock actuator 60, will also be rendered inoperable.

The fold control valve 304 may then be toggled by the crew either directly (i.e. in a manual manner) or via a fold control switch (FIG. 5), which electrically shifts the solenoid-driven fold control valve 304 from the closed, or "relief" position to the "fold", or open position. At this point, pressurized fluid is communicated to another portion of the distribution manifold, and is then dispersed to the main rotor blade assemblies 24 to operate the hinge lock system 54 and the blade fold systems 56.

As the system communicates fluid to the hinge lock system 54, the pressurized fluid is communicated to the first hinge lock actuator 54B of the hinge lock system 54 and thereby forces the hinge lock pin 308B to retract, which, in turn, partially unlocks each main rotor blade 28. After the first hinge lock actuator 54B has been fully disengaged, the pressurized fluid is communicated to the second hinge lock actuator 54A of the hinge lock system 54, to thereby retract that hinge lock pin 308A, which fully unlocks each main rotor blade 28.

After disengagement of the hinge lock system 54, the pressurized fluid then proceeds on to the blade fold actuator system 56 to extend the fold actuator 310 (also illustrated in FIG. 7). As the fold actuator 310 extends, the main rotor blade 28 folds through the hinge linkage 32L which locks the blade in the fully folded position through, for example, an over-center geometry inherent to the hinge linkage 32L (FIG. 7).

Once all the main rotor blades 28 have fully folded, the crew switches the fold control valve 304 and then the pitch lock valve 300 back to the "relief", or closed positions. At this point, the pitch lock actuators 60 are mechanically "locked out" by check valves, frictional interfaces, mechanical detents or other such systems while each main rotor blade 28 is also mechanically "locked out" via the over-center hinge linkage 32L. Also, the hinge lock system 54 is mechanically "locked out" in the retracted position by, for example, a spring-loaded mechanical detent system within each actuator 54A, 54B, or by any of the other mechanical means previously described.

Blade Spread/Pitch Unlock

In one operational example of the blade fold system 50, the main rotor system is unfolded, or spread to a flight position as follows. The crew operates the APU-powered utility system, and reopens, or resets the pitch lock control valve 300 to the "pitch lock engage" position (FIG. 5). The crew then toggles the fold control valve 304 from the closed/"relief" position to the "unfold", or reverse-flow position (FIG. 5). The pressurized fluid is communicated through the blade fold system 50 in the opposite direction to the hinge lock and blade fold operations described above.

The fold actuators 310 begin to retract, which, in turn, forces the main rotor blades 28 to spread via the hinge linkage 32L (FIG. 7). As the main rotor blades 28 spread back into position relative to the sleeve 34 to receive the hinge lock actuator pins 308A, 308B, the main rotor blade 28 depresses the sequence valve 306 plunger which is normally spring-loaded to the fully extended position (which, in turn, closes off the sequence valve 306). At this point, the pressurized fluid from upstream of the fold actuator system 56 is communicated to the hinge lock actuators 54A, 54B which are then forced to extend, or "lock out" the main rotor blades 28 simultaneously.

Once the hinge lock system 54 is fully engaged, a signal may be communicated to the crew, such as through the controller 58, such that the crew is prompted to return the fold control valve 304 to the closed, or "relief" position and to switch the pitch lock control valve 300 to the "unlock", or reverse-flow position. A check valve 312 upstream of the fold control valve 304 prohibits the blade fold system 50 from folding or spreading in this condition. The direction of fluid flow through the pitch lock system 52 is reversed and all of the pitch lock actuators 60 simultaneously retract, or "unlock". It is at this time that the proximity sensor valves 90 would also retract either mechanically via the biasing member 98 or hydraulically via the retract assist conduit 200 (FIG. 11), or via a combination thereof. Once all of the pitch lock actuators 60 have successfully removed the pitch lock pins 88 from the pitch lock pin receptacles 64, the crew will then receive a signal to close, or "relieve" the pitch lock control valve 300. Once the pitch lock control valve 300 has been closed, the main rotor system 12 is free to resume normal flight operations.

Figure 11:
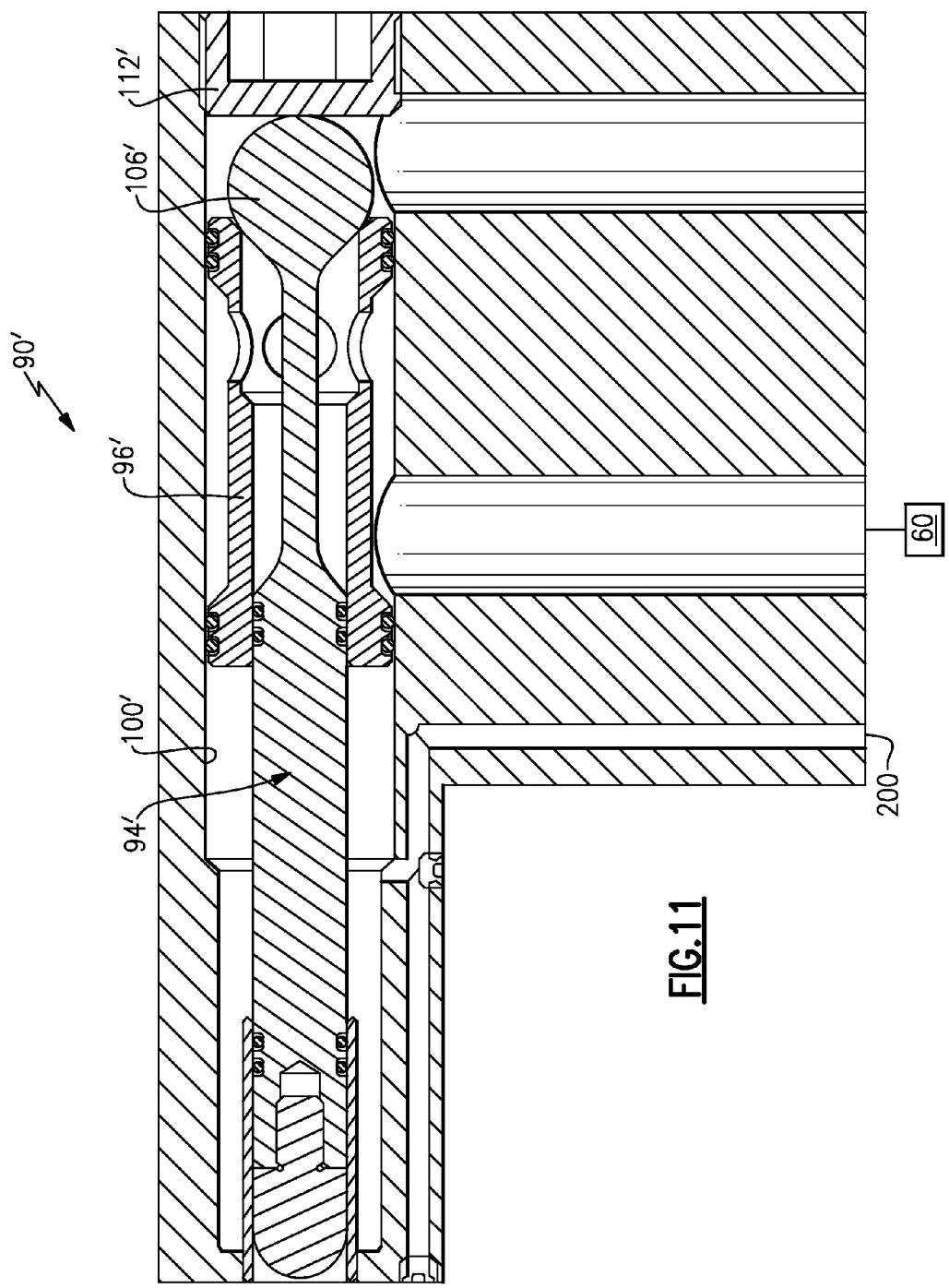
FIG. 11 is a sectional view of another embodiment of a retracted proximity sensor valve having retract assistance, but no biasing member.

Referring to FIG. 11, another embodiment of a proximity sensor valve 90' includes a retract assist conduit 200 to communicate fluid into the cavity 100' to bias the spool 96'. That is, the function of the biasing member 98 (FIGS. 9A-9C) is essentially replaced or at least supplemented by the pressurized hydraulic fluid flow passing through the retract assist conduit 200. The pitch lock control valve 300 can be toggled to a position that reverses the flow, or "crosses" the lines of the pitch lock system 52 once the spread (or unfold) and hinge lock operations have been completed. When this occurs, the lines that were pressurized to extend the proximity sensor valve plunger pin 94' and pitch lock actuator pins 88 during the pitch lock operation now become relief lines and the lines that were relief lines are now pressurized so that the pitch lock actuator pins 88 are forced to retract from the pitch lock pin receptacles 64. During this retraction activity, pilot lines from the pressurized lines to the proximity sensor valve 90' route this retraction pressure to the "stop" end of the spool 96' via the retract assist conduit 200. This, along with the biasing member 98, if also provided, facilitate the overcoming of any potential seizing of the spool 96' from, for example, residue build-up, etc. The spool 96' is thereby driven against the enlarged end section 106' of the plunger, which is then, in turn, driven to the opposite end of the cavity 100' toward the end cap 112'. In this way, the plunger pin 94' returns to a flight-ready, or retracted position.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A fold system comprising:
    a lock system that selectively locks a displaceable member in a folded position; and
    a proximity sensor valve in fluid communication with said lock system, said proximity sensor valve operable to control operation of said lock system in response to extension of a plunger pin from said proximity sensor valve, wherein said lock system includes a loch actuator positionable adjacent to a receptacle housed within said displaceable member that is to be locked, wherein said displaceable member to be locked is a rotor blade assembly of a rotary wing aircraft.

2. The fold system as recited in claim 1, wherein said proximity sensor valve is mounted to said lock actuator.

3. The fold system as recited in claim 2, wherein said proximity sensor valve and said lock actuator are contained within a common housing.

4. The fold system as recited in claim 1, the proximity sensor comprising a housing which defines a fluid inlet and a fluid outlet in communication with a cavity, said plunger pin within said cavity for movement along an axis, said plunger pin movable between an extended position and a retracted position, said plunger pin extends at least partially outward of said housing at said extended position, said proximity sensor further comprising a spool within said cavity for movement along an axis, said spool and said plunger pin movable with respect to each other to control a fluid flow between said fluid inlet and said fluid outlet.

5. The fold system as recited in claim 4, wherein said position of said plunger pin with respect to said spool permits fluid flow in response to said plunger pin movement toward said retracted position.

6. The fold system as recited in claim 4, wherein said position of said plunger pin with respect to said spool prevents fluid flow in response to said plunger pin movement toward said extended position.

7. The fold system as recited in claim 6, wherein said plunger pin includes an enlarged end section engageable with said spool to prevent fluid flow.

8. The fold system as recited in claim 7, wherein said plunger pin includes a reduced diameter section which extends from said enlarged end section and a probe section which extends from said reduced diameter section.

9. The fold system as recited in claim 8, wherein said spool at least partially surrounds said reduced diameter section, said enlarged end section sized to selectively engage said spool to control said fluid flow between said fluid inlet and said fluid outlet.

10. The fold system as recited in claim 8, wherein said spool includes at least one transverse opening.

11. The fold system as recited in claim 10, wherein said spool includes at least one seal groove to support a seal between said fluid inlet and said fluid outlet, said seal remains between said fluid inlet and said fluid outlet throughout spool movement along said axis.

12. The fold system as recited in claim 4, further comprising a biasing member to bias said spool toward said plunger pin retracted position.

13. The fold system as recited in claim 4, further comprising a retract assist port to communicate fluid into said cavity to bias said spool toward said plunger pin retracted position.

14. The fold system as recited in claim 4, wherein said plunger pin includes a sacrificial tip.

15. A fold system comprising:
    a lock system;
    a proximity sensor valve in fluid communication with said lock system, said proximity sensor valve operable to control operation of said lock system in response to extension of a plunger pin from said proximity sensor valve,
    wherein said lock system includes a lock actuator positionable adjacent to a receptacle housed within a displaceable member that is to be locked,
    wherein said displaceable member to be locked is a rotor blade assembly of a rotary wing aircraft,
    wherein said receptacle is housed within a pitch horn which extends from a sleeve of said rotor blade assembly.

16. The fold system as recited in claim 15, further comprising a damper which selectively locates said pitch horn relative to said lock actuator for a fold operation.

17. The fold system as recited in claim 16, wherein said plunger pin is at least partially blocked from extension by said pitch horn when said sleeve is properly positioned for said fold operation.

18. The fold system as recited in claim 16, wherein said plunger pin is fully extended when said sleeve is not properly positioned for said fold operation.

19. A method to confirm position of a displaceable member comprising:
    locating a proximity sensor valve in fluid communication with a lock system, the proximity sensor valve operable to prevent fluid communication to the lock system in response to extension of a plunger pin from the proximity sensor valve; and
    blocking extension of the plunger pin with a pitch horn of a displaceable rotor blade assembly when the pitch horn is properly positioned.

20. A fold system comprising:
    a rotor blade assembly pivotable from a first position to a second position and from the second position to the first position, the second position a folded position relative to the first position;
    a lock system; and
    a proximity sensor valve in fluid communication with said lock system, said lock system to selectively lock said rotor blade assembly in the second position in response to extension of a plunger pin from said proximity sensor valve.

* * * * *